United States Patent [19]
Hirose et al.

[11] Patent Number: 4,952,643
[45] Date of Patent: Aug. 28, 1990

[54] CURABLE POLYMER COMPOSITION

[75] Inventors: Toshifumi Hirose; Kawakubo Kawakubo; Katsuhiko Isayama, all of Kobe, Japan

[73] Assignee: Kanegafuchi Chemical Industry Co., Ltd., Osaka, Japan

[21] Appl. No.: 471,058

[22] Filed: Jan. 29, 1990

Related U.S. Application Data

[63] Continuation of Ser. No. 197,976, May 24, 1988, abandoned.

[30] Foreign Application Priority Data

May 25, 1987 [JP] Japan .................................. 62-128627

[51] Int. Cl.$^5$ .............................................. C08G 65/32
[52] U.S. Cl. ..................................... 525/407; 525/100; 525/101; 525/104; 525/105; 525/106; 525/438; 525/446; 525/476
[58] Field of Search ............... 525/407, 100, 101, 104, 525/105, 106, 476, 438, 446

[56] References Cited

U.S. PATENT DOCUMENTS

| 4,283,513 | 8/1981 | Mikami | 525/476 |
| 4,614,766 | 9/1986 | Schimmel et al. | 525/446 |
| 4,657,986 | 4/1987 | Isayama et al. | 525/407 |

*Primary Examiner*—Melvyn I. Marquis
*Attorney, Agent, or Firm*—Wegner & Bretschneider

[57] ABSTRACT

A curable polymer composition comprising:
(A) an organic elastomeric polymer having, in a molecule, at least one silicon-containing group which is cross linkable through formation of a siloxane bond and
(B) an epoxy resin which has been cured which is easily handled and affords a cured product having improved strength.

10 Claims, No Drawings

CURABLE POLYMER COMPOSITION

This is a continuation of Ser. No. 197,976, filed May 24, 1988, now abandoned.

BACKGROUND OF THE INVENTION

1. Field of the Invention

The present invention relates to a curable polymer composition. More particularly, it relates to a curable composition comprising an epoxy resin which has been cured and an organic elastomeric polymer having, in a molecule, at least one silicon-containing group which is cross linkable through formation of a siloxane bond (hereinafter referred to as "silicon-containing reactive group"), which is easily formulated in a one pack type composition and curable even at room temperature and affords a cured product having improved mechanical properties such as toughness and strength.

2. Description of the Related Art

An organic elastomeric polymer having at least one silicon-containing reactive group in a molecule can be cured through formation of siloxane bonds by a silanol condensation reaction. It has such an interesting characteristics that it can be cured even at room temperature according to following reaction scheme to give a rubbery elastomer:

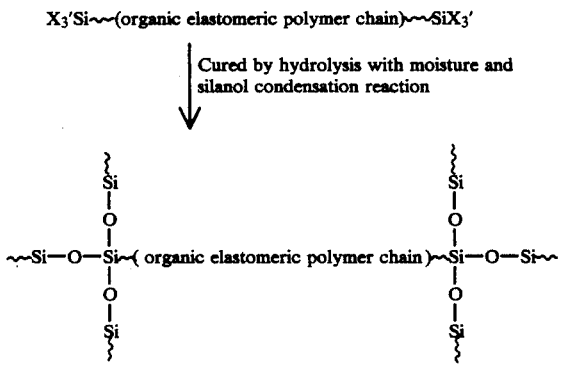

wherein X' is a hydrolyzable group.

However, the cured product has small tensile strength or bond strength.

To improve the tensile strength and bond strength of the cured product of the organic elastomeric polymer having the silicon-containing reactive group, a composition comprising said organic elastomeric polymer and an epoxy resin has been proposed (cf. U.S. Pat. No. 4,657,986, EP-A-0 186 191 and Japanese Patent Kokai Publication No. 268720/1986). However, the concretely disclosed curable resinous composition uses an uncured epoxy resin and, in use, both the organic elastomeric polymer having the silicon-containing reactive group and the epoxy resin are cured.

SUMMARY OF THE INVENTION

An object of the present invention is to provide a curable polymer composition comprising an epoxy resin which has been cured and an organic elastomeric polymer having a silicon-containing reactive group by which tensile strength and/or the bond strength of the cured product are improved.

Accordingly, the present invention provides a curable polymer composition comprising:

(A) an organic elastomeric polymer having at least one silicon-containing reactive group in a molecule and
(B) an epoxy resin which has been cured.

The present invention is based on the finding that the addition of an epoxy resin which has been cured to the organic elastomeric polymer (A) improves the strength such as tensile strength and bond strength of the cured product and affords a curable composition which is easily formulated as a one pack type composition and cured even at room temperature. The organic elastomeric polymer having the silicon-containing reactive group alone can be stored in the form of a one pack type curable polymer and cured as such without addition of any curing agent in use. However, since the epoxy resin should be mixed with a curing agent just before use, it is very difficult to formulate the epoxy resin in the form of a one pack type polymer. Accordingly, it is very difficult to formulate a one pack type curable composition comprising the organic elastomeric polymer having the silicon-containing reactive group and the uncured epoxy resin.

According to the present invention, since the epoxy resin which has been cured is used together with the organic elastomeric polymer having the silicon-containing reactive group, it is possible to formulate the composition in the form of a one pack type curable composition. Although the epoxy resin has been cured, the cured product produced from the curable composition of the present invention has satisfactory strength.

The curable polymer composition of the present invention not only affords a cured product with improved properties but also has good handling properties

DETAILED DESCRIPTION OF THE INVENTION

Specific examples of the organic elastomeric polymer having at least one silicon-containing reactive group in a molecule (A) are polyethers comprising repeating units of the formula: —R—O— in which R is a divalent alkylene group having 2 to 4 carbon atoms such as a polyether which is produced by polymerizing an oxide compound (e.g. propyleneoxide, ethyleneoxide, tetrahydrofuran and the like) and a graft copolymer produced by polymerizing a vinyl monomer (e.g. acrylate, styrene, acrylonitrile, vinyl acetate, etc.) in the presence of the above polyether; polyesters prepared by polycondensation of a dibasic acid (e.g. adipic acid) and glycol or ring opening polymerization of lactons; ethylene-/propylene copolymers; polyisobutylene and copolymers of isobutylene with isoprene and the like; polychloroprene; polyisoprene and copolymers of isoprene with butadiene, styrene, acrylonitrile and the like; polybutadiene and copolymers of butadiene with styrene, acrylonitrile and the like; polyolefins prepared by hydrogenating polyisoprene, polybutadiene or isoprene-/butadiene copolymers; polyacrylates prepared by radical polymerization of acrylate (e.g. ethyl acrylate, butyl acrylate and the like) and copolymers of acrylate with vinyl acetate, acrylonitrile, styrene, ethylene and the like; graft polymers prepared by polymerizing a vinyl monomer in the presence of the organic elastomeric polymer (A); polysulfides; and the like. Among them, the polyethers containing at least 50% by weight, preferably at least 70% by weight of repeating units of the formula: —R—O— in which R is the same as defined above are preferable, since they can be produced in a liquid form in the absence of a solvent and the polyethers having silicon-containing reactive group can be easily produced. Particularly, polypropylene oxide type polymers are preferable since they impart water resistance to the cured product and are cheap and easily handled as liquid materials.

Preferably, the organic elastomeric polymer having the silicon-containing reactive group has a number average molecular weight of about 500 to 50,000, more preferably 1,000 to 20,000, since the polymer is liquid in this molecular weight range and easily handled.

The silicon-containing reactive group includes a silicon-containing group which contains a hydrolyzable group or a hydroxyl group attached to the silicon atom and can be chain extended or cross linked by the silanol condensation reaction. A typical example of such group may be represented by the formula:

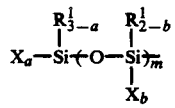  (I)

wherein X is a hydroxyl group or a hydrolyzable group, $R^1$ is a monovalent hydrocarbon group having 1 to 20 carbon atoms or a triorganosiloxy group of the formula:

in which $R^2$ is a monovalent hydrocarbon group having 1 to 20 carbon atoms, "a" is 0, 1, 2 or 3, "b" is 0, 1 or 2 provided that the sum of "a" and "mb" is at least 1, preferably from 1 to 4, and "m" is 0 or an integer of 1 to 18.

When X is the hydrolyzable group, the group (I) is cross linked through hydrolysis by water and a silanol condensation reaction in the presence or absence of a catalyst for the silanol condensation. When X is a hydroxyl group, the group (I) is cross linked through the silanol condensation reaction in the presence or absence of a catalyst for silanol condensation.

Specific examples of the hydrolyzable group are a hydrogen atom, a halogen atom, an alkoxy group, an acyloxy group, a ketoximate group, an amino group, an amide group, an aminoxy group, a mercapto group, an alkenyloxy group and the like. Among them, the alkoxy group having 1 to 8 carbon atoms is preferable since it is mildly hydrolyzed and easily handled. One to three hydrolyzable group can be bonded to one silicon atom.

Specific examples of the group $R^1$ are alkyl groups (e.g. methyl), aryl groups (e.g. phenyl), alkenyl groups (e.g. vinyl) and the like. Among them, methyl is preferable.

The silicon-containing reactive group has at least one silicon atom. When the silicon atoms are bonded through siloxane linkages, the silicon-containing reactive group preferably has not more than 20 silicon atoms.

Among the silicon-containing reactive group, a group of the formula:

  (I)

wherein X and $R^1$ are the same as defined above and "c" is 1, 2 or 3 is preferable from the economical point of view.

The silicon-containing reactive group chemically bonds to the backbone chain of the organic elastomeric polymer. It is not preferable for the silicon-containing reactive group to be bonded to the backbone chain through a bond structure of the formula: ≡Si—O—C≡, since such structure tends to be cleaved by water. A preferable bonding structure between the silicon atom of the reactive group which is closest to the backbone chain and the backbone chain is, for example, a structure of the formula: ≡Si—C≡.

The organic polymer (A) has at least one, preferably 1.2 to 6 silicon-containing reactive groups in a molecule on the average. When the number of the silicon-containing group in a molecule is less than one on the average, the composition of the invention is not effectively cured and the improvement of the properties is not satisfactorily achieved.

The silicon-containing reactive group may be introduced in the organic elastomeric polymer by the following manners;

(1) Copolymerizing a monomer having a copolymerizable unsaturated bond and the silicon-containing reactive group (e.g. vinyltrialkoxysilane, methacryloyloxypropylmethyldialkoxysilane, methacryloyloxypropyltrialkoxysilane and the like) with a polymerizable monomer (e.g. ethylene, propylene, isobutylene, chloroprene, isoprene, butadiene, acrylate and the like); or copolymerizing a monomer having a copolymerizable epoxy group and the silicon-containing reactive group (e.g. γ-glycidoxypropyltrimethoxysilane, γ-glycidoxypropylmethyldimethoxysilane and the like) with propyleneoxide or ethyleneoxide. By this manner, the silicon-containing reactive group is introduced in the side chain of the organic polymer.

(2) Polymerizing a radically polymerizable monomer in the presence of a mercapto or disulfide type chain transfer agent having the silicon-containing reactive group (e.g. mercaptopropyltrialkoxysilane, mercaptopropylmethyldialkoxysilane and the like).

(3) Polymerizing a radically polymerizable monomer by the use of an azo or peroxide type polymerization initiator having the silicon-containing reactive group (e.g. azo-bis-2-(6-methyldiethoxysilyl-2-cyanohexane) and the like).

By the manners (2) and (3), the silicon-containing reactive group is introduced at the chain end of the polymer molecule.

(4) Reacting a compound having a functional group Y' and the silicon-containing reactive group with a polymer having a functional group Y reactive with the functional group Y' (e.g. a hydroxyl group, a carboxyl group, a mercapto group, an epoxy group, an isocyanate group and the like) on the side chain and/or at the chain end of the molecule.

Specific examples of the reaction (4) are shown in following Table.

TABLE 1

| Functional group Y | Functional group Y' | Resulting bond |
|---|---|---|
| —COOH | HO— | —COO— |
| ↑ | CH$_2$——CH— \\ O / | —COOCH$_2$CH— \| OH |
| ↑ | H$_2$N— | COO$^-$H$_3$N$^+$— or —CONH— |

TABLE 1-continued

| Functional group Y | Functional group Y' | Resulting bond |
|---|---|---|
| ↑ | OCN— | —COOCONH— |
| ↑ | $CH_2$=CHCOO— | —COOCH$_2$CH$_2$COO— |
| —OH | OCN— | —OCONH— |
| —SH | CH$_2$—CH—  \\O/ (epoxide) | —SCH$_2$CH—  \|  OH |
| ↑ | OCN— | —SCONH— |
| ↑ | $CH_2$=CHCOO— | —SCH$_2$CH$_2$COO— |
| ↑ | $CH_2$=CH— | —SCH$_2$CH$_2$— |
| ↑ | ClCH$_2$— | —SCH$_2$— |
| —CH—CH$_2$  \\O/ | HOOC— | —CHCH$_2$OCO—  \|  OH |
| ↑ | HS— | —CHCH$_2$S—  \|  OH |
| ↑ | H$_2$N— | —CHCH$_2$NH—  \|  OH |
| ↑ | HO— | —CHCH$_2$O—  \|  OH |
| —NH$_2$ | CH$_2$—CH—  \\O/ | —NHCH$_2$—CH—  \|  OH |
| ↑ | OCN— | —NHCONH— |
| ↑ | HOOC— | —$\overset{+}{NH_3}$O$^-$—CO— or —NHCO— |
| ↑ | ClCH$_2$— | —$\overset{+}{NH_2}$CH$_2$—  \|  Cl$^-$ |
| ↑ | $CH_2$=CHCOO— | —NHCH$_2$CH$_2$COO— |
| —CONH$_2$ | OCN— | —CONHCONH— |
| —CH=CH$_2$ | HS— | —CH$_2$CH$_2$S— |
| ↑ | H—Si≡ | —CH$_2$CH$_2$Si≡ |
| —NCO | HOOC— | —NHCOOCO— |
| ↑ | HO— | —NHCOO— |
| ↑ | HS— | —NHCOS— |
| ↑ | H$_2$N— | —NHCONH— |
| —CH—CH—  \|  \|  O=C  C=O  \\O/ | HO— | —CH—CH—  \|  \|  O=C  C=O  \|  \|  HO  O— |
| ↑ | H$_2$N— | —CH—CH—  \|  \|  O=C  C=O  \|  \|  HO  NH— |

Specific examples of the polymer having the functional group Y which is used as a starting material or an intermediate material are polyether polyols comprising repeating units of the formula: —R—O— wherein R is the same as defined above (e.g. polyoxypropylenepolyol, polyoxyethylenepolyol, polyoxytetramethylenediol and the like); polyesterpolyols prepared by polycondensation of a dibasic acid (e.g. adipic acid) and glycol or ring opening polymerization of lactones; polyols or polycarboxylic acids of polyisobutylene; polyols or polycarboxylic acids of polybutadiene or copolymers of butadiene with styrene, acrylonitrile and the like; polyols of polyolefins prepared by hydrogenating polyisoprene or polybutadiene; polymer having an isocyanate functional group prepared by reacting the above polyols or polycarboxylic acids with polyisocyanate; polymers having an ethylenically unsaturated bond prepared by reacting the above polyols with a halogen-containing ethylenically unsaturated compound, and the like. Among them, preferable are those having the functional group Y at the chain end of the molecule. The polyols may be ones molecular weight of which is increased with a chain extender such as a polyfunctional compound (e.g. polyhalogenated compound).

Specific examples of the silicon-containing compound having the functional group Y' are amino group-containing silanes (e.g. N-β-(aminoethyl)-γ-aminopropyltrimethoxysilane, N-β-(aminoethyl)-γ-aminopropylmethyldimethoxysilane, γ-aminopropyltriethoxysilane and the like); mercapto group-containing silanes (e.g. γ-mercaptopropyltrimethoxysilane, γ-mercaptopropylmethyldimethoxysilane and the like); epoxysilanes (e.g. γ-glycidoxypropyltrimethoxysilane, β-(3,4-epoxycyclohexyl)ethyltrimethoxysilane and the like); ethylenically unsaturated silanes (e.g. vinyltriethoxysilane, γ-methacryloyloxypropyltrimethoxysilane, γ-acryloyloxypropylmethyldimethoxysilane and the like); chlorine-containing silanes (e.g. γ-chloropropyltrimethoxysilane and the like); isocyanate-containing silanes (e.g. γ-isocyanatepropyltriethoxysilane, γ-isocyanatepropylmethyldimethoxysilane and the like); and hydrosilanes (e.g. methyldimethoxysilane, trimethoxysilane, methyldiethoxysilane and the like).

Among the combinations of the polymer having the functional group Y and the compound having the functional group Y', (i) a combination of the polymer having an isocyanate group and the amino group- or mercapto group-containing silane and (ii) a combination of the polymer having an ethylenically unsaturated group and the hydrosilane are preferable. Among the combination (ii), a combination of polypropyleneoxide having an allylether group at the chain end and the hydrosilane is particularly preferable. In the combination (ii), a silyl group can be introduced in the polymer by a hydrosilylation reaction in the presence of a platinum catalyst.

The silicon-containing reactive group having a silicon atom to which a hydroxyl group is attached may be prepared by hydrolyzing the silicon-containing reactive group having a silicon atom to which a hydrolyzable group is attached.

Preferably, the silicon-containing reactive group is attached to the chain end of the organic polymer molecule, because the terminal silicon-containing reactive group elongates the chain length between the adjacent cross linking sites in the cured product so that the rubbery elasticity is easily achieved and consequently the strength of the cured product is increased.

Preferable examples of the organic polymer (A) are disclosed in U.S. Pat. Nos. 3,408,321, 3,453,230 and 3,592,795, Japanese Patent Publication No. 32673/1974, Japanese Patent Kokai Publication (unexamined) Nos. 156599/1975, 73561/1976, 6096/1979, 13767/1980, 13768/1980, 82123/1980, 123620/1980, 125121/1980, 131021/1980, 131022/1980, 135135/1980, 137129/1980, 179210/1982, 191703/1983, 78220/1984, 78221/1984, 78222/1984, 78223/1984 and 168014/1984.

The epoxy resin (B) which has been cured may be a cured resin of any one of conventionally used ones. Specific examples of the epoxy resin are epichlorohydrinbisphenol A type epoxy resin, epichlorohydrin-bisphenol F type epoxy resin, flame-retardant epoxyresins (e.g. glycidyl ether of tetrabromobisphenol A and the like), novolak type epoxy resins, hydrogenated bisphenol A type epoxy resins, epoxy resins of the type of glycidyl ether of bisphenol A-propyleneoxide adduct, glycidyl p-oxybenzoate type epoxy resin, m-aminophenol type epoxy resins, diaminodiphenylmethane type epoxy resins, urethane modified epoxy resins, alicyclic epoxy resins, glycidyl ether of polyhydric alcohol (e.g. N,N-diglycidylaniline, N,N-diglycidyl-o-toluidine, triglycidylisocyanurate, polyalkyleneglycol diglycidyl ether, glycerin and the like), hydantoin type epoxy resins, epoxidized unsaturated polymer such as petroleum resin, and the like. Among them, those having two epoxy groups of the formula:

in a molecule are preferable since they are highly reactive during curing and the cured product easily forms a three dimensional network. Most preferable are the bisphenol A type epoxy resins and the novolak type epoxy resins.

The curing agent may be used for curing the epoxy resin according to the present invention. The curing agent may be any one of the conventionally used ones. Specific examples of the curing agent are amines (e.g. triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine, 2,4,6-tris-(dimethylaminomethyl)-phenol and the like); tertiary amine salts; polyamide resins; imidazoles; dicyanediamides; complex compounds of boron trifluoride, carboxylic acid anhydrides (e.g. phthalic anhydride, hexahydrophthalic anhydride, tetrahydrophthalic anhydride, endomethylenetetrahydrophthalic anhydride, dodecinyl succinic anhydride, pyromellitic anhydride, chlorendic anhydride and the like); alcohols; phenols; and carboxylic acids.

The amount of the curing agent varies with the kinds of the epoxy resin and/or the curing agent. Usually, 0.1 to 300 parts by weight of the curing agent is used based on 100 parts by weight of the epoxy resin.

The cured epoxy resin (B) may be prepared by a conventional method. Generally, the uncured epoxy resin and the curing agent are mixed and cured for several minutes to several days at a room temperature or an elevated temperature. The curing of the epoxy rein may be effected in the presence or absence of a solvent When no solvent is used, the cured epoxy resin is preferably ground by a grinder and used in a powder form. When the solvent is used, the solvent may be removed before use or a mixture of the cured resin and the solvent may be used in a subsequent step.

As the solvent, preferable is one in which the uncured epoxy resin and the curing agent can dissolved but the cured epoxy resin is insolubilized to precipitate in the form of fine powder.

Specific examples of the solvent are hydrocarbons (e.g. hexane, benzene, toluene, xylene, etc.), halogenated hydrocarbons (e.g. chloroform, trichloroethylene, etc.), ketones (e.g. acetone, methyl ethyl ketone, etc.), esters (e.g. ethyl acetate, butyl acetate, etc.) and ethers (e.g. ethyl ether, tetrahydrofuran, diethylcellosolve, etc.). In addition, a conventional plastilizer such as dioctyl phthalate, dibutyl phthalate, dioctyl adipate, trioctyl phosphate, polyethylene glycol ester and polypropylene glycol may be used as the solvent.

The curable polymer composition of the invention may be prepared by mixing the components (A) and (B) according to a conventional method. For example, the components are mixed by a mixer, rolls or a kneader at a room or elevated temperature. Alternatively, the components are dissolved in a small amount of a suitable solvent and mixed. Preferably, the uncured epoxy resin and the curing agent are added to and cured in the organic elastomeric polymer (A). In this method, the polymer (A) and the cured epoxy resin are easily and homogeneously mixed.

A weight ratio of the organic polymer (A) to the cured epoxy resin (B) (A/B) is from 100:1 to 100:200. When the weight ratio exceeds 100:1, the strength of the cured product is insufficient. When the weight ratio is less than 100:200, the cured product has insufficient rubbery properties. The preferable weight ratio of the organic polymer (A) to the cured epoxy resin (B) varies with many factors such as the final use of the cured product. To achieve the rubbery properties of the cured material of the organic elastomeric polymer and to improve the strength of the cured product of the composition, the cured epoxy resin (B) is used in an amount of 10 to 150 parts by weight, preferably 20 to 120 parts by weight per 100 parts of the organic elastomeric polymer (A).

The curable polymer composition according to the present invention may contain a silicon compound having a silicon-containing reactive group and a functional group reactive with an epoxy group as an optional component (C) so as to further increase the strength of the cured product.

Examples of the functional group reactive with the epoxy group are a primary, secondary or tertiary amino group, a mercapto group, an epoxy group and a carboxyl group. The silicon-containing reactive group is the same as that of the organic polymer (A). Particularly, a silicon-containing reactive group having an alkoxysilyl group which is bonded to the silicon atom is preferable due to its good handling properties.

Specific examples of the silicone compound (C) are amino group-containing silanes (e.g. γ-aminopropyltrimethoxysilane, γ-aminopropyltriethoxysilane, γ-aminopropylmethyldimethoxysilane, N-β-(aminoethyl)-γ-aminopropyltrimethoxysilane, N-β-(aminoethyl)-γ-aminopropylmethyldimethoxysilane, N-β-(aminoethyl)-γ-aminopropyltriethoxysilane, γ-ureidopropyltriethoxysilane, N-β-(N-vinylbenzylaminoethyl)-γ-aminopropyltrimethoxysilane, γ-anilinopropyltrimethoxysilane and the like); mercapto group-containing silanes (e.g. γ-mercaptopropyltrimethoxysilane, γ-mercaptopropyltriethoxysilane, γ-mercaptopropylmethyldimethoxysilane, γ-mercaptopropylmethyldiethoxysilane and the like); epoxy group-containing silanes (e.g. γ-glycidoxypropyltrimethoxysilane, γ-glycidoxypropylmethyldimethoxysilane, γ-glycidoxypropyltriethoxysilane, β-(3,4-epoxycyclohexyl)ethyltrimethoxysilane and the like); carboxysilanes (e.g. β-carboxyethyltriethoxysilane, β-carboxyethylphenylbis(2-methoxyethoxy)silane, N-β-(N-carboxymethylaminoethyl)-γ-aminopropyltrimethoxysilane and the like). The silicon compound may be used alone or as a mixture with at least one other silicon compound.

The amount of the silicon compound (C) is so selected that a weight ratio of the total weight of the organic polymer (A) and the epoxy resin (B) to the weight of the silicon compound (C), i.e. (A+B)/C, is from 100:0 to 100:20.

In addition to the essential components (A) and (B) and the optional component (C), the composition of the invention may optionally contain other conventionally used additives such as a filler, a plasticizer, a silanol condensation catalyst for curing the organic polymer (A), an antiaging agent, a ultraviolet absorbing agent, a lubricant, a pigment, a foaming agent and the like.

Specific examples of the filler are wood meal, pulp, cotton chip, asbestos, glass fiber, carbon fiber, mica, walnut shell flour, rice hull flour, graphite, diatomaceous earth, china clay, fumed silica, precipitated silica, silicic anhydride, carbon black, calcium carbonate, clay, talc, titanium oxide, magnesium carbonate, quartz powder, aluminum powder, flint powder, zinc powder, and mixtures thereof.

The curable composition of the invention can be cured at a room temperature although the curing rate is increased at an elevated temperature of 100° to 150° C. Accordingly, the curable composition of the present invention can be cured in a wide temperature range from a low temperature to a high temperature according to the application field of the composition.

The curable composition of the present invention can be easily formulated in the form of a one pack type composition by dehydrating the composition and adding a silanol condensation catalyst to the substantially anhydrous composition.

The curable composition of the present invention may be formed by any one of the conventional molding methods such as those employed for molding a solid rubber such as a natural rubber or a liquid elastomer such as liquid polyurethane. By molding the curable composition of the present invention by such method, a solid rubber article or a foam rubber article having improved strength can be produced. In addition, the curable composition of the present invention can be used as a rubber base adhesive, a sealing material, a pressure sensitive adhesive, a potting agent and so on.

The present invention will be hereinafter explained further in detail by following examples.

PREPARATION EXAMPLE 1

To an autoclave equipped with a stirrer, polypropyleneoxide 97% of the terminal groups of which were allylether groups (CH$_2$=CHCH$_2$O—) (Average molecular weight, 8,000) (800 g) was charged followed by the addition of methyldimethoxysilane (19 g). Then, a solution of chloroplatinic acid (8.9 g of H$_2$PtCl$_6$.6H$_2$O dissolved in a mixture of 18 ml of isopropyl alcohol and 160 ml of tetrahydrofuran) (0.34 ml) was added, and the reaction was carried out at 80° C. for 6 hours.

An amount of the unreacted methyldimethoxysilane in the reaction mixture was monitored by IR spectrum analysis to find that substantially no said compound remained. According to determination of the silicon-containing group by NMR, it was confirmed that polypropyleneoxide having, at the chain end, about 1.7 groups of the formula:

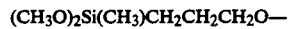
(CH$_3$O)$_2$Si(CH$_3$)CH$_2$CH$_2$CH$_2$O— in a molecule on the average was obtained.

PREPARATION EXAMPLE 2

The polymer prepared in Preparation Example 1 (75 g) was charged in a reactor followed by evaporation under reduced pressure and replacement with nitrogen. Then, the polymer was heated to 90° C. and stirred.

In the polymer, a separately prepared mixture of n-butyl acrylate (24.5 g), γ-mercaptopropylmethyldimethoxysilane (0.4 g) and azobisisobutyronitrile (AIBN) (0.1 g) was dropwise added over one hour. After 15 minutes and 30 minutes from the completion of addition of the mixture, AIBN (each 0.0025 g) dissolved in a four time weight of acetone was added. After the final addition of AIBN, the reaction mixture was stirred for further 30 minutes to complete polymerization.

The product was a pale yellow transparent viscous liquid containing 0.9% of the unreacted monomers by gas chromatography analysis and having a Brookfield viscosity of 260 poise (23° C.). The polymer had a number average molecular weight of 10,000 according to the GPC analysis. From the charged amounts of methyldimethoxysilane and γ-mercaptopropylmethyldimethoxysilane, it was found that about two methyldimethyxysillyl groups on the average per molecule of the polymer was introduced.

PREPARATION EXAMPLE 3

To a flask equipped with a stirrer, polypropyleneoxide-triol (Average molecular weight, 3,000) (300 g) was charged followed by the addition of sodium hydroxide (40 g). The temperature was raised to 60° C. Thereafter, dibromomethane (17.4 g) was added and reacted for 10 hours, and allyl chloride (31.6 g) was added and reacted for 6 hours at 80° C. The content in the flask was diluted with n-hexane (1 liter) and added with aluminum silicate (50 g). The mixture was stirred for one hour at room temperature and filtered. The filtrate was evaporated by an evaporator to remove the volatile components to obtain a polymer having a number average molecular weight of about 6,100 and containing, at the chain end, about four allylether groups (CH$_2$=CHCH$_2$O—) per molecule according to the iodine value analysis.

To an autoclave equipped with a stirrer, the obtained polymer (122 g) and methyldimethoxysilane (8.6 g) were added and then a solution of chloroplatinic acid (8.9 g of H$_2$PtCl$_6$·6H$_2$O dissolved in a mixture of 18 ml of isopropyl alcohol and 160 ml of tetrahydrofuran) (0.05 ml) was added. The reaction was carried out at 80° C. for 6 hours to obtain polypropyleneoxide having a number average molecular weight of about 6,400 and, at the chain end, about 3.6 groups of the formula:

(CH$_3$O)$_2$Si(CH$_3$)CH$_2$CH$_2$CH$_2$O— per molecule on the average.

EXAMPLE 1

The polymer prepared in Preparation Example 1 (100 g), Bisphenol A type epoxy resin (Epikote 828 (trade name) manufactured by Yuka Shell Epoxy Co., Ltd.) (30 g) and 2,4,6-tris(dimethylaminomethyl)phenol (3.0 g) were charged in a 500 ml flask the interior of which had been throughly replaced with nitrogen and mixed to obtain a homogeneous transparent viscous liquid. Then, the flask was placed on an oil bath and the liquid was stirred at 80° C. for 2 hours to cure the epoxy resin to obtain a pale yellow liquid having viscosity of 700 poise (23° C.) in which the cured epoxy resin was dispersed.

To the pale yellow liquid, a silanol condensation catalyst #918 (an organic tin compound manufactured by Sankyo Organic Synthesis) (2 g) and water (0.4 g) were added and carefully poured in a polyethylene made frame so as to avoid the formation of bubbles. Then, the mixture was cured at 23° C. for 2 days and post-cured at 50° C. for 3 days to produce a sheet of the cured product having a thickness of 3 mm.

From the sheet, a No. 3 dumbbell was punched according to JIS (Japanese Industrial Standard) K 6301. Tensile strength at break (T$_B$) and elongation at break (E$_B$) were measured at a pulling rate of 500 mm/min. to find that the cured product was a high strength rubbery material having T$_B$ of 45 kg/cm$^2$ and E$_B$ of 350%.

EXAMPLE 2

In the same manner as in Example 1 but further adding N-β-(aminoethyl)-γ-aminopropyltrimethoxysilane (2.5 g), a dumbbell shape sample was produced. It was a high strength rubbery cured product having T$_B$ of 63 kg/cm$^2$ and E$_B$ of 390%.

COMPARATIVE EXAMPLE 1

To the polymer prepared in Preparation Example 1 (100 g), as the silanol condensation catalyst, #980 (2.0 g) and water (0.4 g) were added and throughly mixed. Then, in the same manner as in Example 1, a dumbbell shape sample was produced. It had small T$_B$ of 4.1 kg/cm.

COMPARATIVE EXAMPLE 2

In the same manner as in Comparative Example 1 but further adding N-β-(aminoethyl)-γ-aminopropyltrimethoxysilane (2.5 g), a dumbbell shape sample was produced. It had small T$_B$ of 5.0 kg/cm$^2$.

EXAMPLE 3

In the same manner as in Example 2 but using the polymer prepared in Preparation Example 2 in place of the polymer prepared in Preparation Example 1, a dumbbell shape sample was produced. It was a high strength rubbery cured product having T$_B$ of 28 kg/cm$^2$ and E$_B$ of 360%.

EXAMPLE 4

The polymer prepared in Preparation Example 1 (100 g), Epikote 828 (30 g), 2,4,6-tris(dimethylaminoethyl)-phenol (3.0 g) and N-β-(aminoethyl)-γ-aminopropyl-trimethoxysilane (1.0 g) were charged in a 500 ml flask the interior of which had been replaced with nitrogen and homogeneously mixed to obtain a transparent viscous material. Then, this transparent material was stirred at 120° C. for 4 hours to cure the epoxy resin to obtain a pale yellow opaque viscous material having a viscosity of 6,200 pose (23° C.) in which the cured epoxy resin was dispersed. The opaque viscous material (134 g) was mixed with #918 (2.0 g) and water (0.4 g) and a dumb-bell shape sample was produced in the same manner as in Example 1. It was a high strength cured product having T$_B$ of 27 kg/cm$^2$ and E$_B$ of 320%.

In the following Examples, the compositions of the present invention were used as adhesives.

EXAMPLES 5–8 and COMPARATIVE EXAMPLES 3–4

By using each of the compositions prepared in Examples 1–4 and Comparative Examples 1 and 2, a test piece for testing adhesivity was prepared and adhesive strength was evaluated.

Tensile shear strength (JIS K 6850)

On an aluminum plate (according to JIS H 4000. A-1050P. 100 mm×25 mm×2.0 mm) which had been lightly wiped with acetone, the composition was coated on an area of about 25 mm×12.5 mm in a thickness of about 0.05 mm. A pair of the same plates coated with the composition were laminated with facing the coated areas each other and pressed by hand. The laminated plates were kept at 23° C. for one day and then at 50° C. for three days and peeled off at a pulling rate of 5 mm/min. to measure the maximum load at which the adhesive was broken. The tensile shear strength was calculated by dividing the maximum load by the shear area.

T-shape peeling strength (JIS K 6854)

On an aluminum plate (according to JIS H 4000. A-1050P. 200 mm×25 mm×0.1 mm) which had been lightly wiped with acetone, the composition was coated on an area of about 100 mm×25 mm in a thickness of about 0.3 mm. A pair of the same plates coated with the composition were laminated with facing the coated areas to each other and pressed five times by moving a hand roller with 5 kg of load along the length in one direction. The laminated plates were kept at 23° C. for one day and then at 50° C. for three days and peeled off at a pulling rate of 200 mm/min. to measure the T-shape peeling strength. The strength at which the adhesive was broken was defined as T-shape peeling strength.

The results are shown in Table 2.

TABLE 2

| Example No. | Composition | Tensile shear strength (kg/cm²) | T-shape peeling strength (kg/2.5 cm) |
| --- | --- | --- | --- |
| 5 | Example 1 | 50.5 Adhesive failure | 6.0 Adhesive failure |
| 6 | Example 2 | 84.0 Adhesive failure | 9.2 Adhesive failure |
| 7 | Example 3 | 40.0 Adhesive failure | 7.2 Adhesive failure |
| 8 | Example 4 | 73.5 Adhesive failure | 6.0 Adhesive failure |
| Comparative 3 | Comp. Ex. 1 | 11.0 Interface failure | 0.9 Interface failure |
| Comparative 4 | Comp. Ex. 2 | 12.2 Interface failure | 1.0 Interface failure |

EXAMPLE 9

The polymer prepared in Preparation Example 1 (100 g), Epikote 828 (30 g), 2,4,6-tris(dimethylaminoethyl)-phenol (5.0 g) and N-β-(aminoethyl)-γ-aminopropyl-trimethoxysilane (1.0 g) were charged in a 500 ml flask the interior of which had been replaced with nitrogen and mixed at room temperature for 2 hours to cure the epoxy resin and disperse the cured epoxy resin. To the mixture, toluene (15 g) was added and homogeneously mixed, and water was azeotropically distilled off under reduced pressure of 2 mmHg at 80° C. for 1 hour. The pressure was increased to atmospheric pressure with nitrogen. Thereafter, N-β-(aminoethyl)-γ-aminopropyltrimethoxysilane (2.5 g) and #918 (2.0 g) were added and homogeneously mixed to obtain a one pack type composition. The composition was stored in a sealed container at 502 C. for 14 days or at 23° C. for one month and removed from the container. The composition showed no increase of viscosity, which means that the composition had good shelf stability. Adhesivity of the composition before and after storage was measured in the same manners as in Examples 5 to 8. The results are shown in Table 3.

TABLE 3

| | Tensile shear strength (kg/cm²) | T-shape peeling strength (kg/2.5 cm) |
| --- | --- | --- |
| Original | 72.0 Adhesive failure | 6.2 Adhesive failure |
| After 50° C. × 14 days | 68.2 Adhesive failure | 5.8 Adhesive failure |
| After 23° C. × 1 month | 71.8 Adhesive failure | 6.3 Adhesive failure |

EXAMPLE 10

The polymer prepared in Preparation Example 3 (100 g), Epikote 828 (50 g) and 2,4,6-tris(dimethylaminoethyl)phenol (5.0 g) were charged in a 500 ml flask the interior of which had been replaced with nitrogen and thoroughly mixed to obtain a transparent viscous material. Then, this transparent material was heated on an oil bath at 80° C. for 4 hours to cure the epoxy resin to obtain a pale yellow opaque viscous material in which the cured epoxy resin was dispersed. In the same manner as in Example 1, the opaque material (155 g) was mixed with #918 (2.0 g) and water (0.4 g) and molded to obtain a sample sheet having a thickness of 3 mm and its strength was measured. It was a high strength rubbery cured material having $T_B$ of 42 kg/cm² and $E_B$ of 310%.

EXAMPLE 11

In the same manner as in Example 10 but further adding γ-aminopropyltriethoxysilane (10 g) to the composition, a dumbbell shape sample was prepared. It was a high strength rubbery cured product having $T_B$ of 55 kg/cm² and $E_B$ of 330%.

EXAMPLE 12

The adhesive strength of the composition prepared in Example 11 was measured in the same manner as in Examples 5 to 8. The tensile shear strength was 49 kg/cm² and T-shape peeling strength was 6.1 kg/2.5 cm. Failure in both tests was adhesive failure.

What is claimed is:

1. A curable polymer composition comprising:
   (A) an organic elastomeric polymer having, in a molecule, at least one silicon-containing group which is cross linkable through formation of a siloxane bond, said organic elastomeric polymer being selected from the group consisting of a polyether which includes repeating units of the formula —R—O— in which R is a divalent alkylene group having 2 to 4 carbon atoms and a graft copolymer produced by polymerizing a vinyl monomer in the presence of said polyether, and
   (B) an epoxy resin which has been cured with a curing agent in the presence of a solvent in which an uncured epoxy resin and the curing agent can be dissolved, and wherein the cured epoxy resin is insolubilized to precipitate in the form of fine powder.

2. The curable polymer composition according to claim 1, wherein the weight ratio of the organic elastomeric polymer (A) to the epoxy resin which has been cured (B) is from 100:1 to 100:200.

3. The curable polymer composition according to claim 1, wherein the organic elastomeric polymer (A) has a backbone chain consisting of a polyether comprising repeating units of the formula: —R—O— in which R is a divalaent alkylene group having 2 to 4 carbon atoms.

4. The curable polymer composition according to claim 1, wherein the organic elastomeric polymer (A) has a graft copolymer produced by polymerizing a vinyl monomer in the presence of the polyether.

5. The curable polymer composition according to claim 1, wherein the silicon-containing group which is cross linkable through formation of a siloxane bond is a silicon-containing group having an alkoxy group bonded to the silicon atom.

6. A curable polymer composition comprising:
   (A) an organic elastomeric polymer having, in a molecule, at least one silicon-containing group which is cross linkable through formation of a siloxane bond, said organic elastomeric polymer being selected form the group consisting of a polyether which includes repeating units of the formula —R—O— in which R is a divalent alkylene group having 2 to 4 carbon atoms and a graft copolymer produced by polymerizing a vinyl monomer in the presence of said polyether, and
   (B) an epoxy resin which has been cured in the organic elastomeric polymer with a curing agent in the presence of a solvent in which an uncured epoxy resin an the curing agent can be dissolved.

7. The curable polymer composition according to claim 6, wherein the weight ratio of the organic elastomeric polymer (A) to the epoxy resin which has been cured (B) is from 100:1 to 100:200.

8. The curable polymer composition according to claim 6, wherein the organic elastomeric polymer (A) has a backbone chain consisting of a polyether which includes repeating units of the formula: —R—O— in which R is a divalent alkylene group having 2 to 4 carbon atoms.

9. The curable polymer composition according to claim 6, wherein the organic elastomeric polymer (A) has a graft copolymer produced by polymerizing a vinyl monomer in the presence of the polyether.

10. The curable polymer composition according to claim 6, wherein the silicon-containing group which is cross linkable through formation of a siloxane bond is a silicon-containing group having an alkoxy group bonded to the silicon atom.

* * * * *